Figure 1A:
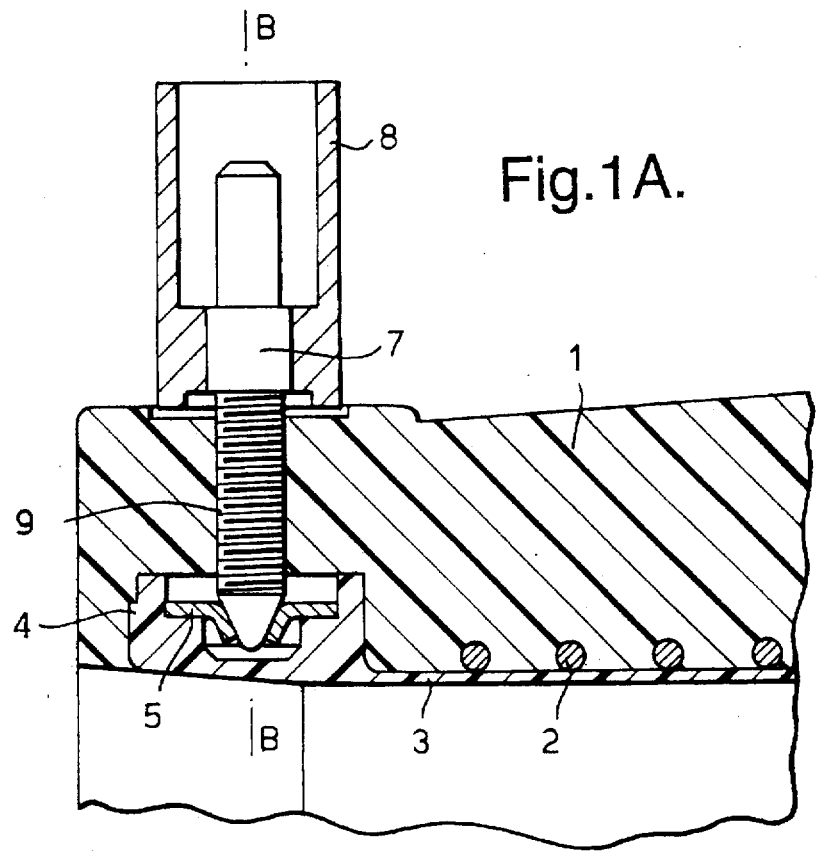

United States Patent [19]

Barfield

[11] Patent Number: 5,697,143

[45] Date of Patent: Dec. 16, 1997

[54] METHOD OF MANUFACTURING AN ELECTROFUSION COUPLER

[75] Inventor: Malcolm R. Barfield, West Midlands, United Kingdom

[73] Assignee: Glynwed Plastics Ltd., Cannock, United Kingdom

[21] Appl. No.: 427,964

[22] Filed: Apr. 26, 1995

[30] Foreign Application Priority Data

Apr. 28, 1994 [GB] United Kingdom .................. 9408461

[51] Int. Cl.$^6$ .................................................. H05B 3/00
[52] U.S. Cl. .................. 29/611; 29/530; 29/619; 156/274.2; 264/262; 264/272.18
[58] Field of Search ...................... 156/293, 274.2; 29/611, 530, 619; 264/262, 272.18

[56] References Cited

U.S. PATENT DOCUMENTS

| 1,982,279 | 11/1934 | Apple ........................... 18/34 |
| 3,943,334 | 3/1976 | Sturm . |
| 4,727,242 | 2/1988 | Barfield . |
| 4,825,534 | 5/1989 | White et al. .................. 29/611 |
| 5,163,713 | 11/1992 | Brettell et al. . |
| 5,229,581 | 7/1993 | Boult d'Auria . |

FOREIGN PATENT DOCUMENTS

| 0 055 891 A1 | 7/1982 | European Pat. Off. . |
| 0 105 068 A1 | 4/1984 | European Pat. Off. . |
| 0 123 625 A1 | 10/1984 | European Pat. Off. . |
| 0 221 396 B1 | 5/1987 | European Pat. Off. . |
| 0 243 062 | 10/1987 | European Pat. Off. . |
| 0 260 014 B1 | 3/1988 | European Pat. Off. . |
| 0 303 909 B1 | 2/1989 | European Pat. Off. . |
| 0 396 273 | 11/1990 | European Pat. Off. . |
| 0 402 200 | 12/1990 | European Pat. Off. . |
| 0 535 247 | 4/1993 | European Pat. Off. . |
| 1372303 | 8/1964 | France . |
| 2174434 | 10/1973 | France . |
| 2 221 679 | 10/1974 | France . |
| 1048106 | 12/1958 | Germany . |
| 2121464 | 8/1972 | Germany . |
| 57-125016 | 8/1982 | Japan . |
| 1373761 | 11/1974 | United Kingdom . |
| 1603169 | 11/1981 | United Kingdom . |
| 2 128 131 | 4/1984 | United Kingdom . |

OTHER PUBLICATIONS

Japanese Patent Abstract; Title: "*Manufacture of Fusion–Bonding Joint*"; 28 Mar. 1990, Publication No.: JP2022021 (Sekisui Chem Co Ltd.); Publication Date: 24 Jan. 1990.

*Primary Examiner*—Carl J. Arbes
*Attorney, Agent, or Firm*—Fulwider Patton Lee & Utecht, LLP

[57] ABSTRACT

In the manufacture of an electrofusion coupler, a winding of an electrical resistance heating wire is wound directly around a mandrel which comprises two parts providing respective ends of the mandrel. The mandrel supports electrically conducting terminal elements by means of supporting locations on the mandrel parts which form an integral part of the mandrel. The resistance wire wound around the mandrel is connected to the electrically conducting terminal elements. Subsequently a body of thermoplastics is molded around the mandrel to form the electrofusion coupler, and thereafter the mandrel parts are extracted axially from the electrofusion coupler from opposite ends, leaving the winding and terminal elements in place in the electrofusion coupler. In a variant, a thermoplastic preform is manufactured having electrically conducting terminal plates secured thereto, the preform having an electrical resistance heating wire wound therearound and secured to said terminal plates. An outer thermoplastics jacket is then molded around the wound preform and said terminal plates, with bores being formed in said outer jacket extending to holes in the terminal plates. Subsequently electrical terminals having screw-threaded shanks are screwed into said bores and into electrical contact with said terminal plates.

15 Claims, 4 Drawing Sheets

METHOD OF MANUFACTURING AN ELECTROFUSION COUPLER

THIS INVENTION relates to a method of manufacturing an electrofusion coupler for use in the construction of thermoplastics pipe systems wherein a welded joint between adjoining ends of adjoining sections of plastics pipe, or of such a pipe section and a tubular member forming part of the pipe fitting, valve or the like, is obtained by forcing such adjoining ends into such an electrofusion coupler and energising the same.

Such an electrofusion coupler takes the form of a sleeve of thermoplastics material having an electrical resistance heater embedded therein and extended around the sleeve. When adjoining pipe ends or the like are forced into the sleeve from opposite ends and the resistance heating wire, and thus the sleeve, is subsequently heated by passing an electric current through the wire, both the material of the sleeve and the material of the inserted pipe ends or the like are locally softened and fused, whereby an intimate connection is obtained, in the form of a welded joint which, when the assembly has cooled, is leak-tight to fluids. The coupler remains in situ forming a permanent part of the joint.

Typically, the electrical resistance wire takes the form of coil embedded in the thermoplastics sleeve and coaxial therewith, the wire lying close to the inner surface of the sleeve, the ends of the wire being connected to terminal points, exposed on the exterior of the sleeve for connection to a source of electrical current.

British Gas Corporation Patent No. 2090588 discloses a method of manufacturing an electrofusion coupler of the above-noted character in which a tubular thermoplastics preform, destined to form the radially inner part of the electrofusion coupler, is first formed by injection moulding and is subsequently mounted on a rotatable winding mandrel by means of which the preform is rotated about its axis to wind on its outer surface a helical winding of electrical resistance heating wire fed thereto by a guide. The guide incorporates a heater by means of which the wire is heated electrically as it is wound on the preform so that as it is wound on it melts the outer surface of the preform when it touches the same and thus becomes at least partially embedded in the preform. The wire guide incorporates an electrical heater which heats the wire as it passes therethrough onto the preform. The preform is provided with terminal pegs at either end, the free end of the wire being attached to the terminal peg at one end before winding commences and the wire being attached at its other end to the other terminal peg after winding. The wound preform is then inserted within a mould in which an outer encapsulating jacket of thermoplastics material is injection moulded therearound, becoming united with the preform, the now integral preform and encapsulating jacket forming the finished electrofusion coupler.

It is an object of the present invention in one of its aspects to provide an improvement over the method of Patent No. 2090588 which provides a greater flexibility in the manufacturing process such that any of a variety of different terminal configurations can be quickly and easily provided in the electrofusion coupler in order to meet the various customer terminal and shroud-type requirements.

According to this aspect of the invention, in the manufacture of an electrofusion coupler, a thermoplastic preform is manufactured having electrically conducting terminal plates secured therein, the preform having an electrical resistance heating wire wound therearound and secured to said terminal plates, an outer thermoplastics jacket then being moulded around the wound preform and said terminal plates, with bores being formed in said outer jacket extending to said terminal plates and subsequently electrical terminals having screw-threaded shanks are screwed into said bores and into electrical contact with said terminal plates.

In other aspects, the invention relates to methods of manufacturing electrofusion couplers in which no plastics preform is utilised, the electrical heating wire being wound directly around a mandrel which subsequently forms the core of a mould in which the plastics body of the electrofusion coupler is moulded around the core and said winding.

Thus, in accordance with these other aspects, the invention provides various methods of forming an electrofusion coupler comprising winding a heating wire around a mandrel, supporting electrically conducting terminal elements on the mandrel by means of supporting locations which form an integral part of the mandrel, connecting the resistance wire that is used to heat the electrofusion coupler to the electrically conducting terminal elements, subsequently moulding a body of thermoplastics around the mandrel to form the electrofusion coupler, and thereafter extracting the mandrel from the electrofusion coupler leaving the winding and terminal elements in place in the electrofusion coupler.

Figure 1B:
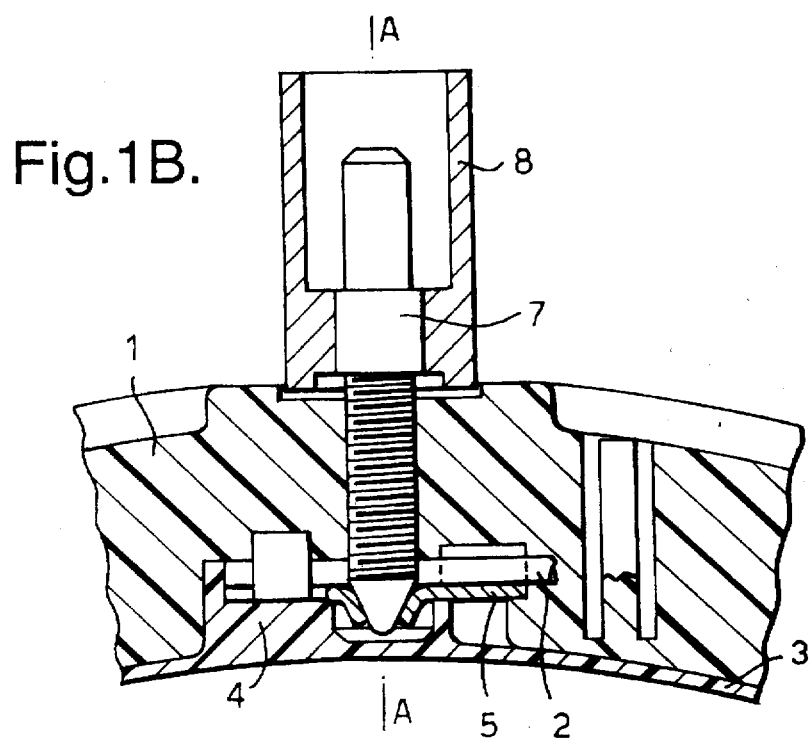
Figure 2A:
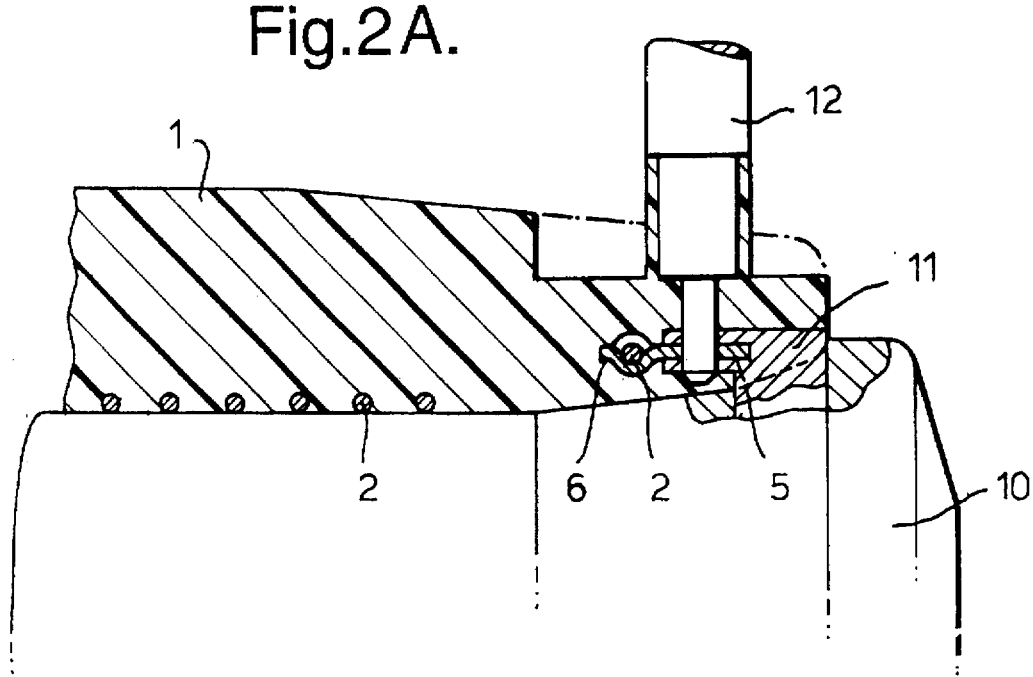
Figure 2B:
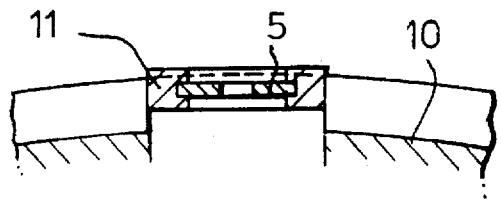
Figure 2C:
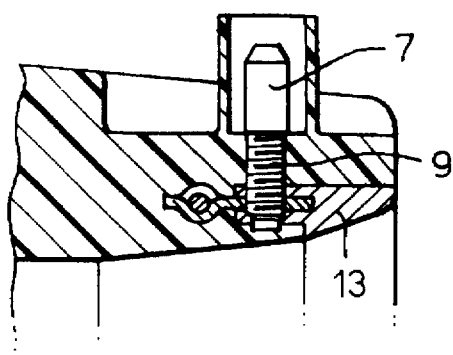
Figure 2D:
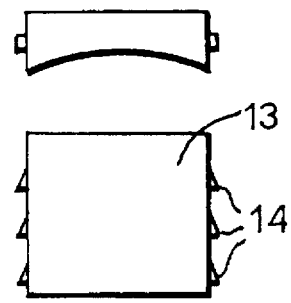
Figure 3A:
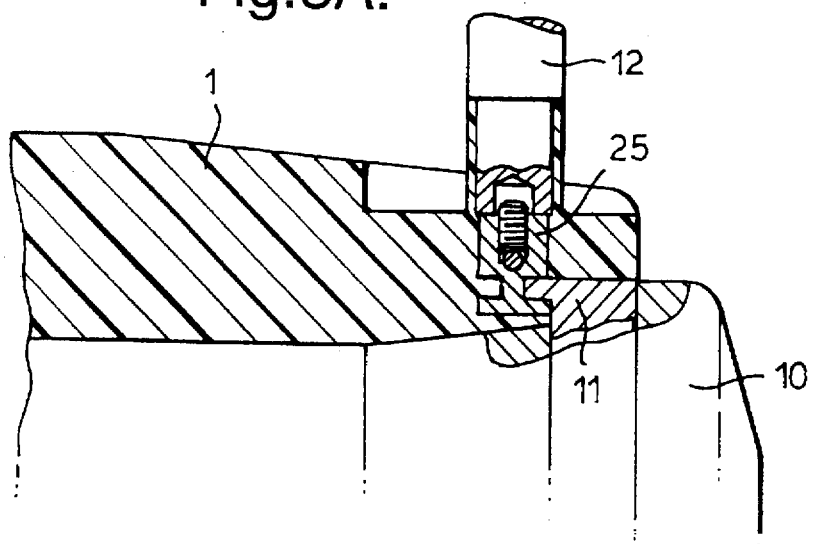
Figure 3B:
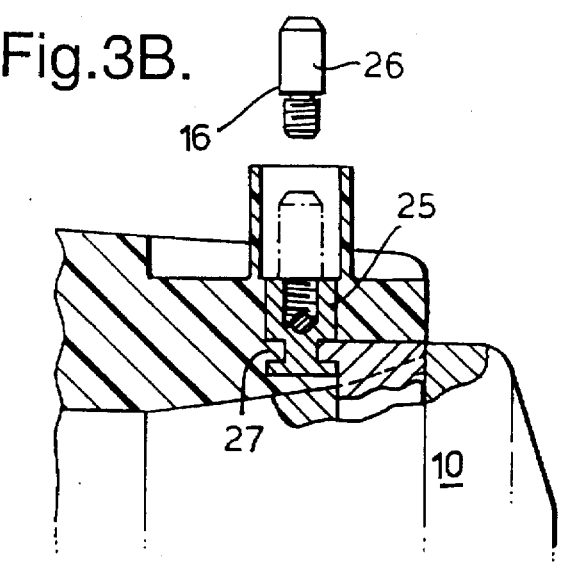
Figure 3C:
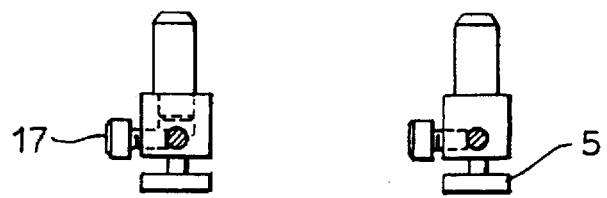
Figure 4A:
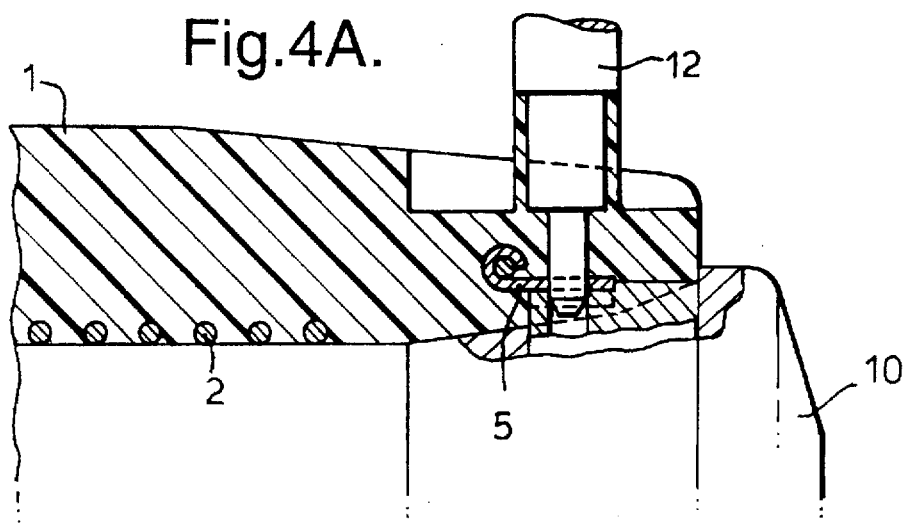
Figure 4B:
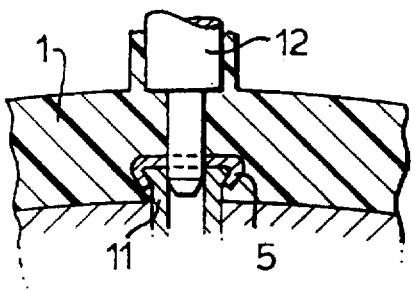
Figure 4C:
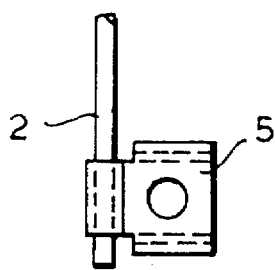
Figure 4D:
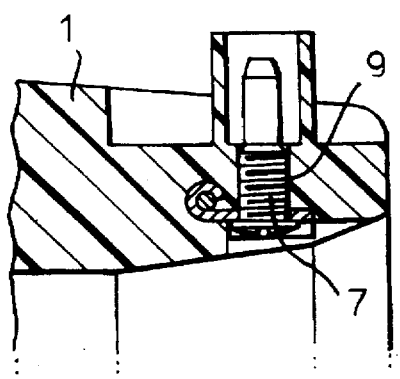

Embodiments of the invention are described below by way of example with reference to the accompanying drawings, in which:

FIG. 1A is a partial view in axial section of an electrofusion coupler embodying the invention along the line A—A in FIG. 1B, FIG. 1B is a cross sectional view along the line B—B in FIG. 1A, FIG. 2A is a partial view in axial section of a mandrel or core, the thermoplastics body of an electrofusion coupler moulded around the core, a side core, a terminal plate and part of an electrical resistance heating winding of the electrofusion coupler, all in accordance with a second embodiment of the invention, FIG. 2B is a partial view of the mandrel and a terminal plate in partial cross-section along the axis of the side core in FIG. 2A, FIG. 2C is a partial axial section view of the finished electrofusion coupler of FIGS. 2A, along the axis of an electrical terminal thereof, FIG. 2D shows in end view in the upper part of the figure and in plan view (in the lower part of the figure) an insert segment used in the electrofusion coupler of FIG. 2A, FIG. 3A is a partial axial section view similar to FIG. 2A but illustrating the manufacture of a third form of electrofusion coupler embodying the invention, FIG. 3B is a partial axial section view of the third embodiment illustrating assembly of a terminal arrangement, FIG. 3C illustrates an alternative terminal arrangement for the electrofusion coupler of FIGS. 3A and 3B, FIG. 4A is a view similar to FIGS. 2A and 3A but showing the manufacture of a still further form of electrofusion coupler embodying the invention, FIG. 4B is a partial view in cross section through the axis of the aide core in FIG. 4A, FIG. 4C is a plan view of a terminal plate and attached heating wire, and FIG. 4D is a partial axial section view corresponding to FIG. 4A, but showing the finished electrofusion coupler with the mandrel or core removed.

Referring to FIGS. 1A and 1B, there is illustrated schematically part of a completed electrofusion coupler 1 containing an electrical resistance heating wire 2 which is wound around on a pre-moulded preform 3 around which an outer layer or jacket of thermoplastics has been moulded, thereby encapsulating the winding. The preform 3 has a receiving formation 4 for retaining an electrically conducting terminal plate 5. The resistance heating wire 2 is attached to the electrically conducting terminal plate 5 utilising either a mechanical crimp or lock, solder joint or spot welding techniques. An outwardly projecting terminal connection 7 supporting a terminal shroud 8 is screwed into a bore formed in the outer jacket of the electrofusion coupler 1. More particularly, the terminal connector 7 is formed with a self-tapping screw-threaded shank which is screwed into said bore in the outer jacket until, when the shank is screwed home fully, its inner end enters, and makes good electrical contact with, an aperture or recess in terminal plate 5. In manufacture of the electrofusion coupler of FIGS. 1A and 1B, the terminal plates 5 (one at each end of the preform), are inserted in complementary receiving formations 4, being, for example, a snap-fit in these formations 4 or being mechanically deformed during application to formations 4 in such a way as to be thereafter captive thereon. The electrical resistance heating wire 2 is then wound around the preform, being secured to one terminal plate, for example by crimping tags of the terminal plate around the wire, then wound around the preform and then secured to the other terminal plate in the same manner as to the first. (Alternatively, the terminal plates may be crimped to the wire before the respective terminal plates are applied to their respective receiving formations 4).

The preform, for example, fitted around a core, is then inserted in an injection mould, side cores to define the bores for shanks 9 are projected radially or chordally into engagement with the recesses or apertures in the middle of the terminal plates and the outer layer or jacket of the thermoplastics coupler is moulded around the wound preform and allowed to solidify after which the side cores are retracted, the mould opened and the product de-moulded.

The terminal connections 7, with the insulating plastics shrouds 8 moulded therearound, are then screwed into the bores left in the plastics jacket by the side cores and into the holes or recesses in the respective terminal plates 5. Various configurations of terminal diameter and shroud design, type and size can be accommodated in order to comply with individual customer requirements. Thus, the same electrofusion coupler body 1 can be utilised to satisfy the requirements of a number of customers.

Referring to FIGS. 2A, 2B, 2C and 2D, there is illustrated schematically a variant of the manufacturing method described with reference to FIGS. 1A and 1B. In this variant, the resistance heating wire 2 is wound directly around a mandrel 10 with said resistance heating wire being again under longitudinal tension. The wire 2 is connected to electrically conducting elements or terminal plates 5. In this embodiment, the mandrel 10 is in two parts which are removed axially, in opposite directions from opposite ends of the moulded electrofusion coupler (see below). A respective terminal plate 5 is again located adjacent each end of the finished electrofusion coupler. Accordingly a respective terminal plate 5 is carried by each mandrel part by a respective projection 11 which stands proud of the cylindrical or frusto-conical surface of the mandrel part in the region which adjoins the respective end of the electrofusion coupler subsequently moulded around the mandrel. The projection 11 includes a pair of parallel arms which are cantilevered from a root part of projection 11 in a direction towards the middle of the mandrel, parallel with the mandrel axis, whereby a space into which the plastics material moulded around the mandrel can flow, is defined between these parallel arms and the curved mandrel surface. The parallel arms are spaced apart circumferentially of the mandrel and each has, along its side facing the other, a longitudinal groove to receive a respective lateral edge portion of terminal plate 5 when the plate is slid into the space between these parallel arms. The terminal plate 5 has tags 6 which are mechanically crimped around the heating wire at the appropriate stage in winding the wire around the mandrel. Thus the terminal plate 5 may be fitted between its parallel arms before the wire is engaged with said tags or the terminal plate tags may be crimped around the wire before the terminal plate is slid into place between the respective parallel arms. In either case, the aforementioned connections of the wire to the electrically conducting elements 5 serve to maintain the longitudinal tension in the resistance heating wire. The wire is then cut, as before, between the wire source and the mandrel and the wound mandrel is then encapsulated in thermoplastics in a moulding operation thus forming the electrofusion coupler 1. Just prior to moulding, a side core 12 of the mould is extended radially through a central aperture in the terminal plate 5 as shown in FIG. 2A. This side core 12 has a relatively thin end portion which fits the aperture in terminal plate 5 and forms the hole into which the shank 9 (FIG. 2C) of an outwardly projecting terminal 7 screws and a portion of greater diameter which defines, in the moulded product, the inner surface of a moulded socket surrounding terminal 7 and adapted to receive an electrical connector.

After the thermoplastics material has been injection moulded around the mandrel, the side cores 12 are withdrawn radially and the mandrel core parts are extracted axially from the moulded product. On extraction of the mandrel 10 from the encapsulated electrofusion coupler 1, recesses are left in the end faces of the electrofusion coupler by the projections 11. These recesses are subsequently filled by inserting into each an insert segment 13 (shown in FIG. 2D) having incorporated on them gripping quadrants or barbs 14 which prevent the insert segments from becoming dislodged. The insert segments, for example of plastics, isolate electrically the parts of terminal plates 5 exposed within said recesses.

Finally, or if preferred prior to insertion of segments 13, a terminal 16, in the form of screw having an elongate plain enlarged head forming a terminal prong, and having a self-tapping screw shank, is screwed into the respective bore left by each side core until, in much the same fashion as described with reference to FIGS. 1A and 1B, it passes into the hole in the respective terminal plate 5 to make good electrical contact with plate 5 and thus with wire 2.

Referring to FIGS. 3A, 3B and 3C, there is illustrated schematically a variant of the method described with reference to FIGS. 2A to 2D. In this variant the terminal arrangement at each end of the electrofusion coupler comprises a generally cylindrical metal body 25, for example of brass, which has an annular groove therearound adjacent one end (the inner or lower end as viewed in FIGS. 3A to 3C). The cantilevered arms of projection 11 are in this case so dimensioned and spaced apart as to fit snugly in the groove 27, on either side of the body 25, when the latter is located between said arms, whereby the body 25 is supported in a position in which it extends radially outwardly with respect to the central axis of the mandrel as illustrated in FIG. 3A.

The body 25 has a diametral through bore through which the heating wire 2 can be threaded and has an axial, screw threaded bore extending from its end further from groove 27 to receive a clamping screw by means of which the wire 2 can be clamped within body 2. In the arrangement illustrated in FIGS. 3A and 3B, prior to and during the moulding step, the resistance heating wire 2 is held in bodies 25, and thus in tension around the mandrel, by a grub-screw 18, which is removed after the encapsulation moulding process and replaced by a screw-in terminal prong, referenced 26.

As shown in FIG. 3A, a respective side core 12 of the mould, which defines the recess in the finished product within which the respective terminal prong is located, engages the outer end of the respective body 25 and assists in holding the latter in place during moulding. It will be appreciated, of course, that the side core could be formed with an elongate bore to receive the head of prong screw 26 so that the screw 26 could be used from the start for clamping wire 2, dispensing with the need for a separate grub screw. In another possible arrangement, illustrated in FIG. 3C, the clamping of the heating wire in the body 25 is effected by a side-action clamping screw 29 screwed into a screw threaded bore extending radially, perpendicular to the diametral bore through which wire 2 passes. In such an arrangement, the contact prong may, if desired, be integral with body 25.

Referring to FIGS. 4A, 4B and 4C, there is illustrated schematically a further variant of the method of FIG. 2. In this variant a contact plate 5, having again a central aperture, is so supported during moulding of the electrofusion coupler that, after moulding, the central portion of the plate 5, including the central aperture and the region surrounding it, is exposed on the radially inner side of the contact plate within a radially extending recess opening onto the wall of the main bore in the electrofusion coupler, and a terminal pin is screwed through the central aperture in plate 5 and through an aligned radial side bore from within the main bore, to project, as a contact prong, on the outside of the electrofusion coupler.

Thus, in this variant, the projection 11 from the mandrel has the cross-sectional form shown in FIG. 4B, i.e. has the form of a longitudinally extending rib which flares slightly towards its radially outer surface to have a dovetail shape. The terminal plate 5 has, in cross-section (FIG. 4B) the form of an inverted channel with side walls which converge towards the channel mouth so that the channel has a cross section complementary with that of the outer part of rib 11 whereby the plate 5 can be slid longitudinally over the outer end of rib 11 to be retained reliably thereon during moulding. The rib 11 has a radial bore which aligns with the central aperture in plate 5 and receives the radially inner end of a minor diameter portion of a side core 12 of the mould which is extended radially through the central aperture in the plate 5 and into the bore in rib 11 prior to moulding the electrofusion coupler, in the injection mould, around the mandrel. The mandrel again has an outer portion of larger diameter, to define a contact prong recess in the finished coupler.

As best shown in FIGS. 4A and 4C, the plate 5 again has a tag which is crimped around the wire 2 to secure the tag to the wire.

With the wire 2 wound around the mandrel and crimped in the tags of the plates 5 fitted to the ribs 11 and with the wound mandrel located within the injection mould and the side cores extended through the plates 5 and into the bores in ribs 11, the thermoplastics body of the electrofusion coupler is moulded around the wound mandrel. The side cores are then withdrawn radially and the mandrel parts withdrawn axially whereby the ribs 11 are slid out of their plates 5, leaving the latter held captive by the moulded plastics. However, a radially extending recess, corresponding to the respective rib 11 and extending as far as the radially inner surface of each plate 5 is left extending from the wall of the main bore of the electrofusion coupler. There is now screwed through the central aperture in each plate 5 and into the respective aligned radial bore left by the side core in the plastics material, from the main bore, a respective terminal screw having a slotted head, which engages the radially inner surface of plate 5, a self-tapping screw-threaded shank portion adjoining the slotted head, and which self-tapping shank portion forms a complementary screw thread in the respective radial bore in the plastics body, and a plain shank portion, of reduced diameter relative to the self-tapping shank portion, and which projects into the recess in the plastics body defined by the larger diameter part of the respective side core and which plain shank portion forms a respective contact prong.

I claim:

1. A method of manufacturing an electrofusion coupler, comprising providing a thermoplastic preform having mounting formations for electrically conducting terminal plates, providing electrically conducting terminal plates having bores therethrough, securing said terminal plates in said mounting formations, winding an electrical resistance heating wire around the preform and securing said wire to said terminal plates, moulding an outer thermoplastics jacket around the wound preform and said terminal plates, said moulding step including providing side cores in engagement with said terminal plates to form bores in said outer jacket extending to said terminal plates, the method further including providing electrical terminal pins having screw-threaded shanks and, after said moulding of said outer jacket, screwing said shanks into respective said bores and into electrical contact with said terminal plates.

2. A method of manufacturing an electrofusion coupler comprising providing a mandrel formed from two parts, each part having a respective collar portion defining a respective end of the electrofusion coupler, the mandrel having integral supporting formations comprising projections spaced apart from the mandrel's surface and extending from the respective said collar in a direction parallel with the mandrel axis, supporting electrically conducting terminal elements on the mandrel by means of said supporting formations, winding an electrical resistance heating wire around the mandrel, connecting the resistance wire to the electrically conducting terminal elements, subsequently molding a body of thermoplastics around the mandrel to form the electrofusion coupler, and thereafter extracting the mandrel from the electrofusion coupler by axial movement of each mandrel part from the respective end of the electrofusion coupler leaving the winding and terminal elements in place in the electrofusion coupler.

3. A method according to claim 2 wherein said moulding step includes placing said mandrel, with said terminal elements and said winding, within an outer mould and injecting molten thermoplastics material into the space between the mandrel and the outer mould.

4. A method according to claim 3 wherein, prior to said step of injecting molten plastics, side cores are extended through said space, each said side core having a larger diameter portion to define a terminal socket, extending into the electrofusion coupler from its outside and a smaller diameter end portion to define, in the moulded electrofusion coupler, a narrower bore extending inwardly from said terminal socket.

5. A method according to claim 4 wherein each said terminal element has a hole therethrough which extends generally radially with respect to the mandrel when the terminal element is mounted on its supporting location on the mandrel, said side cores being so positioned that the inner ends of said smaller diameter end portions thereof are aligned with, and engage in, the respective holes in the respective terminal elements at the end of said step of extending said side cores into said space.

6. A method according to claim 5 wherein said side cores are extended into said holes in said terminal elements mounted on their supporting locations before the outer mould is closed about said terminal elements and said side cores.

7. A method according to claim 3 wherein each said terminal element is in the form of a body having a bore therethrough to receive said wire and a transverse intersecting screw-threaded bore to receive a clamping screw for clamping said wire in the first-mentioned bore.

8. A method according to claim 7 wherein prior to said step of injecting molten plastics, side cores are extended through said space, to engage said terminal elements, said side cores defining generally radially extending sockets in the moulded coupler which terminate at their inner ends in said terminal elements.

9. A method according to claim 8 including the step of locating contact pins in said sockets by screwing screw-threaded portions of the contact pins into said screw-threaded bores.

10. A method of manufacturing an electrofusion coupler comprising providing a mandrel form from two parts, each part having a respective collar portion defining a respective end of the electrofusion coupler, the mandrel having integral supporting formations comprising projections spaced apart from the mandrel's surface and extending from the respective said collar in a direction parallel with the mandrel axis, supporting electrically conducting terminal elements on the mandrel by means of said supporting formations, winding an electrical resistance heating wire around the mandrel, connecting the resistance wire to the electrically conducting terminal elements, subsequently molding a body of thermoplastics around the mandrel to form the electrofusion coupler by placing said mandrel, with said terminal elements and said winding, within an outer mold, extending side cores through a space between the mandrel and the outer mold, each said side core having a larger diameter portion to define a terminal socket, extending into the electrofusion coupler from its outside and a smaller diameter end portion, injecting molten thermoplastics material into the space between the mandrel and the outer mold, said side core smaller diameter end portion defining, in the molded electrofusion coupler, a narrower bore extending inwardly from said terminal socket, and thereafter extracting the mandrel from the electrofusion coupler by axial movement of each mandrel part from the respective end of the electrofusion coupler leaving the winding and terminal elements in place in the electrofusion coupler.

11. A method according to claim 10 wherein each said terminal element has a hole therethrough which extends generally radially with respect to the mandrel when the terminal element is mounted on its supporting location on the mandrel, said side cores being so positioned that the inner ends of said smaller diameter end portions thereof are aligned with, and engage in, the respective holes in the respective terminal elements at the end of said step of extending said side cores into said space.

12. A method according to claim 11 wherein said side cores are extended into said holes in said terminal elements mounted on their supporting locations before the outer mould is closed about said terminal elements and said side cores.

13. A method of manufacturing an electrofusion coupler comprising providing a mandrel form from two parts, each part having a respective collar portion defining a respective end of the electrofusion coupler, the mandrel having integral supporting formations comprising projections spaced apart from the mandrel's surface and extending from the respective said collar in a direction parallel with the mandrel axis, supporting electrically conducting terminal elements on the mandrel by means of said supporting formations, winding an electrical resistance heating wire around the mandrel, connecting the resistance wire to the electrically conducting terminal elements, subsequently molding a body of thermoplastics around the mandrel to form the electrofusion coupler by placing said mandrel, with said terminal elements and said winding, within an outer mold and injecting molten thermoplastics material into the space between the mandrel and the outer mold, each said terminal element being in the form of a body having a bore therethrough to receive said wire and a transverse intersecting screw-threaded bore to receive a clamping screw for clamping said wire in the first-mentioned bore, and thereafter extracting the mandrel from the electrofusion coupler by axial movement of each mandrel part from the respective end of the electrofusion coupler leaving the winding and terminal elements in place in the electrofusion coupler.

14. A method according to claim 13 wherein prior to said step of injecting molten plastics, side cores are extended through said space, to engage said terminal elements, said side cores defining generally radially extending sockets in the moulded coupler which terminate at their inner ends in said terminal elements.

15. A method according to claim 14 including the step of locating contact pins in said sockets by screwing screw-threaded portions of the contact pins into said screw-threaded bores.

\* \* \* \* \*